（12） United States Patent
Park

(10) Patent No.: US 10,718,898 B1
(45) Date of Patent: Jul. 21, 2020

(54) INTEGRATED ACTIVE DEVICES WITH IMPROVED OPTICAL COUPLING TO DIELECTRIC WAVEGUIDES

(71) Applicant: Hyundai Park, Goleta, CA (US)

(72) Inventor: Hyundai Park, Goleta, CA (US)

(73) Assignee: Nexus Photonics LLC, Santa Barbara, CA (US)

( * ) Notice: Subject to any disclaimer, the term of this patent is extended or adjusted under 35 U.S.C. 154(b) by 0 days.

(21) Appl. No.: 16/254,883

(22) Filed: Jan. 23, 2019

(51) Int. Cl.
   *G02B 6/12* (2006.01)
   *G02B 6/122* (2006.01)
   *G02B 6/13* (2006.01)

(52) U.S. Cl.
   CPC ....... *G02B 6/12004* (2013.01); *G02B 6/1228* (2013.01); *G02B 6/13* (2013.01)

(58) Field of Classification Search
   None
   See application file for complete search history.

(56) References Cited

U.S. PATENT DOCUMENTS

| | | | |
|---|---|---|---|
| 6,083,843 A * | 7/2000 | Ohja | G02B 6/30 216/24 |
| 8,368,995 B2 | 2/2013 | Dallesasse | |
| 9,134,478 B2 | 9/2015 | Park | |
| 9,360,644 B2 | 6/2016 | Fasano | |
| 2014/0294341 A1* | 10/2014 | Hatori | G02B 6/12 385/14 |
| 2018/0100970 A1* | 4/2018 | Park | G02B 6/1228 |

OTHER PUBLICATIONS

A W Fang et al "Electrically pumped hybrid AlGaInAs-silicon evanescent laser" Opt. Express 14, 9203-9210 (2006).

* cited by examiner

*Primary Examiner* — Jerry Rahll
(74) *Attorney, Agent, or Firm* — Shalini Venkatesh

(57) ABSTRACT

An optical device comprises first, second and third elements fabricated on a common substrate. The first element comprises an active waveguide structure supporting a first optical mode, the second element comprises a passive waveguide structure supporting a second optical mode, and the third element, at least partly butt coupled to the first element, comprises an intermediate waveguide structure. If the first optical mode differs from the second optical mode by more than a predetermined amount, a tapered waveguide structure in at least one of the second and third elements facilitates efficient adiabatic transformation between the first optical mode and the second optical mode. Mutual alignments of the first, second and third elements are defined using lithographic alignment marks.

11 Claims, 7 Drawing Sheets

INTEGRATED ACTIVE DEVICES WITH IMPROVED OPTICAL COUPLING TO DIELECTRIC WAVEGUIDES

FIELD OF THE INVENTION

The present invention relates to semiconductor processing. More specifically, certain embodiments of the invention relate to a method and system for realization of photonic integrated circuits using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves. The material platform most commercially utilized for photonic integrated circuits is indium phosphide (InP), which allows for the integration of various optically active and passive functions on the same chip. Although many current PICs are realized in InP platforms, there has been significant research in the past decade in using silicon rather than InP for the realization of PICs, due to some superior characteristics as well as superior processing capabilities for the former material, that leverage the investment already made for electronic integrated circuits.

The biggest drawback in using silicon for PICs is that it is an indirect bandgap material which makes it hard to provide electrically pumped sources. This problem is generally solved by assembling PICs comprising two or more chips made from dissimilar materials in separate processes. Such an approach is challenging due to a need for very fine alignment, which increases packaging costs and introduces scaling limitations. Another approach to solving the bandgap problem is to bond two dissimilar materials and process them together, removing the need for precise alignment and allowing for mass fabrication. In this disclosure, we use the term "hybrid" to describe the first approach that includes precise assembly of separately processed parts, and we use the term "heterogeneous" to describe the latter approach of bonding two materials and then processing the bonded result, with no precise alignment necessary.

To transfer the optical signal between dissimilar materials, the heterogeneous approach utilizes tapers whose dimensions are gradually reduced until the effective mode refractive indices of dissimilar materials match and there is efficient power transfer. This approach generally works well when materials have similar refractive indices as is the case with silicon and InP. In cases where there is larger difference in effective indices, such as between e.g. SiN and InP or GaN, the requirements on taper tip dimensions become prohibitive limiting efficient power transfer. Specifically, extremely small taper tip widths (of the order of nanometers) may be necessary to provide good coupling. Achieving such dimensions is complex and may be cost prohibitive.

Although InP and silicon-based PICs address many current needs, they have some limitations; among them the fact that the operating wavelength range is limited by material absorption increasing the losses, and the fact that there is a limit on the maximum optical intensities and consequently optimal powers that a PIC can handle. To address these limitations, alternate waveguide materials have been considered, such as SiN, $TiO_2$, $Ta_2O_5$, AlN or others. In general, such dielectric waveguides have higher bandgap energies which provides better high-power handling and transparency at shorter wavelength, but, in general such materials also have lower refractive indices. E.g. SiN with bandgap of ~5 eV has refractive index of ~2, AlN has bandgap of ~6 and refractive index of around ~2, and $SiO_2$ with bandgap of ~8.9 eV has refractive index of ~1.44. For comparison, the refractive index of GaAs and InP is >3. This makes the tapered approach challenging.

The alternative hybrid approach suffers from the drawbacks already mentioned above, namely the need for precise alignment, and correspondingly complex packaging and scaling limitations.

There remains, therefore, a need for a method that provides efficient optical coupling between materials (such as, for example, the III-V materials mentioned above, used for active devices, and simple dielectric materials used for waveguides) with dissimilar refractive indices, without requiring prohibitively narrow taper tips. This would allow for scalable integration of materials for the realization of PICs. Ideally, PICs made by such a method would operate over a wide wavelength range from visible to IR and be able to handle high optical power compared to typical Si-waveguide-based PICs.

In this disclosure we call a device or a region of a device active if it is capable of light generation, amplification, modulation and/or detection.

SUMMARY OF THE INVENTION

The present invention includes devices and methods for providing practical and efficient optical coupling between elements comprising materials of different refractive indices, with particular relevance to integrated PICs.

In one embodiment, an optical device comprises first, second and third elements fabricated on a common substrate; wherein the first element comprises an active waveguide structure supporting a first optical mode, the second element comprises a passive waveguide structure supporting a second optical mode, and the third element, at least partly butt coupled to the first element, comprises an intermediate waveguide structure. In this embodiment, if the first optical mode differs from the second optical mode by more than a predetermined amount, a tapered waveguide structure in at least one of the second and third elements facilitates efficient adiabatic transformation between the first optical mode and the second optical mode. Mutual alignments of the first, second and third elements are defined using lithographic alignment marks.

In another embodiment, a method for making an optical device comprises: forming a first element, comprising a dielectric material, on a substrate; forming a waveguide, configured to support a first optical mode, in the first element; attaching a second element comprising an active material, capable of light generation when electrically pumped, to the substrate; forming a waveguide configured to support a second optical mode in the second element; forming electrical contacts in the second element; and forming, on the substrate, an intermediate waveguide element, the intermediate waveguide element being positioned and configured to facilitate transformation between the first and second optical modes, if the first optical mode differs from the second optical mode by more than a predetermined amount.

DETAILED DESCRIPTION

Figure 1:
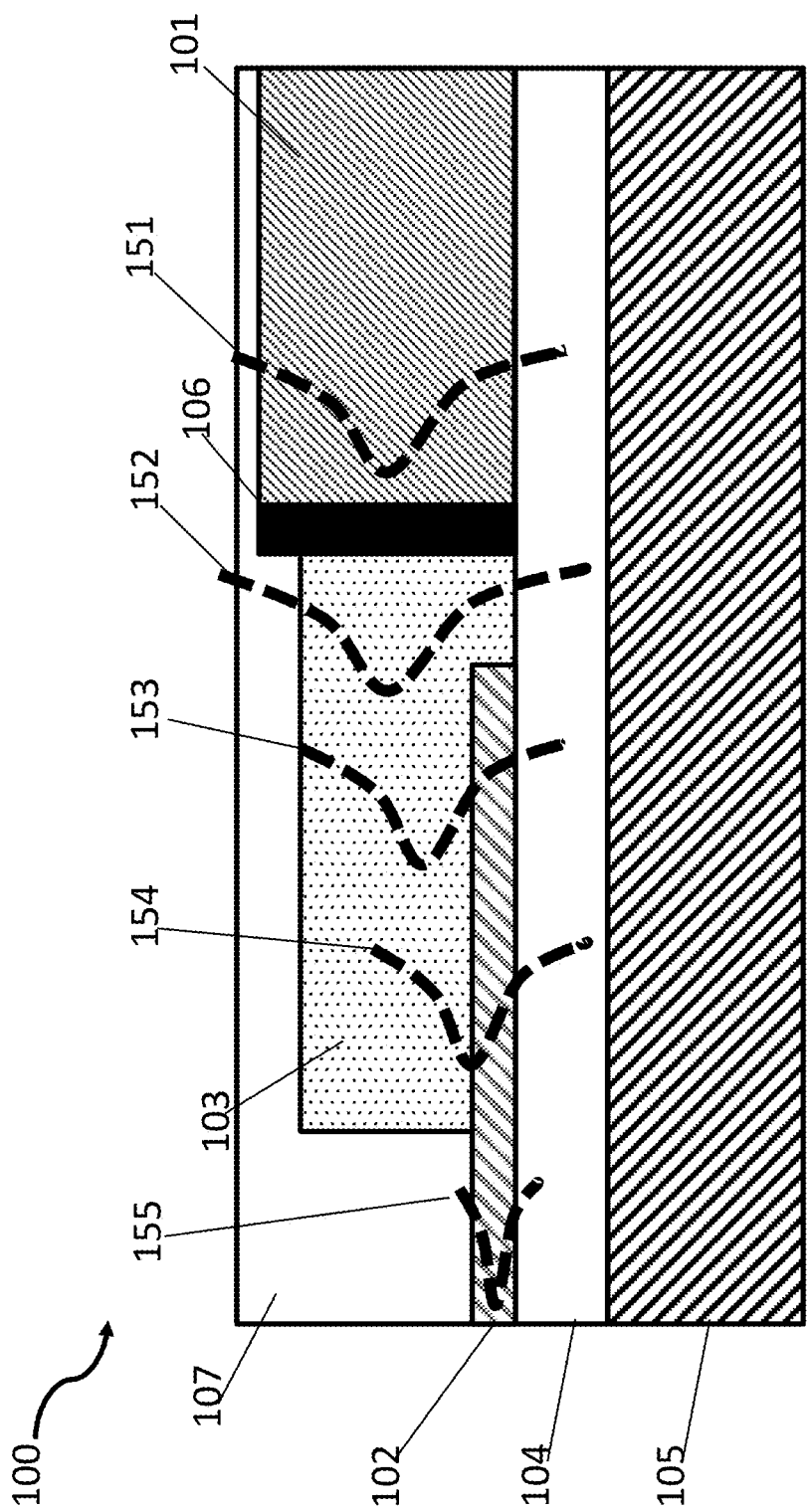
FIG. 1 illustrates a device according to one embodiment of the present invention, shown in cross-section.

Described herein include embodiments of a method and system for realization of photonic integrated circuits using wafer bonding and deposition of dissimilar materials where optical coupling is improved by use of mode conversion and a butt-coupling scheme.

In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, as described below with regard to elements 106, 206 etc.

Terms "active device" and/or "active region", may be used herein. A device or a region of a device called active is capable of light generation, amplification, modulation and/or detection. We use active device and active region interchangeably meaning either one of them and/or both. This is in contrast to "passive device" and/or "passive region" whose principal function is to confine and guide light, and or provide splitting, combining, filtering and/or other functionalities that are commonly associated with passive devices.

FIG. 1 is a schematic cross-section view of an integrated photonic device 100 utilizing butt-coupling and mode conversion for efficient coupling between dissimilar materials. The exemplary cross-section includes a substrate 105 that can be any suitable substrate for semiconductor and dielectric processing, such as Si, InP, GaAs, quartz, silicon-on-insulator or other materials known in the art. In the shown embodiment, a layer of second material 104 is deposited, grown, transferred, bonded or otherwise attached to the top surface of substrate 105 using techniques known in the field. The main purpose of layer 104 is to provide optical cladding for material 102 (to be described below), if necessary to form an optical waveguide. Optical waveguides are commonly realized by placing higher refractive index core between two lower refractive index layers to confine the optical wave. In some embodiments, layer 104 is omitted and substrate 105 itself serves as a cladding.

Layer 102 is deposited, grown, transferred, bonded or otherwise attached to the top of layer 104 if present, and/or to the top of substrate 105, using techniques known in the field. The refractive index of layer 102 is higher than the refractive index of layer 104 if present, or, if layer 104 is not present, the refractive index of layer 102 is higher than the refractive index of substrate 105. In one embodiment, the material of layer 102 may include, but is not limited to, one or more of SiN, $TiO_2$, $Ta_2O_5$, $SiO_2$, and AlN. In some embodiments, other common dielectric materials may be used for layer 102. In other embodiments, a semiconductor material used for layer 102 may include, but not be limited to, one or more of Si, GaAs, AlGaAs, InP.

Either or both of layers 104 and 102 can be patterned, etched, or redeposited as is common in the art. before layer 101 is bonded on top of the whole or part of the corresponding (104, 102) top surface. Said bonding can be direct molecular bonding or can use additional materials to facilitate bonding such as e.g. metal layers or polymer films as is known in the art. Layer 101 makes up what is commonly called an active region, and may be made up of materials including, but not limited to, InP and InP-based ternary and quaternary materials, GaAs and GaAs based ternary and quaternary materials, GaN, GaP, InAs and InSb and their variations and derivatives. Layer 101 in one embodiment is multilayered, comprising layers providing both optical and electrical confinement as well as electrical contacts, as is known in the art for active devices. In yet another embodiment, layer 101 uses lower layers 102, 104 and/or 105 to provide electrical and/or optical confinement and one or more electrical contacts.

In some embodiments, layer 101 can be efficiently electrically pumped to generate optical emission and gain. The present invention enables efficient optical coupling between waveguides formed in layer 101 and layer 102. Said materials 102 can provide additional functionality such as wideband transparency, high intensity handling, phase shifting by temperature, strain or other tuning mechanisms, combining, splitting, filtering and/or others as is known in the art.

Efficient coupling is facilitated by layer 103, and, in cases where layer 106 is present, by layer 106. Optional layer 106 primarily serves as either an anti-reflective or a highly-reflective coating at the interface between layer 101 and layer 103. Layer 103 serves as an intermediate waveguide that in some embodiments accepts the profile (depicted by dashed line 151) of an optical mode supported by the waveguide for which layer 101 provides the core, captures it efficiently as mode profile 152, and gradually transfers it to mode profiles 153, 154 and finally 155. Mode profile 155 is then efficiency coupled to the waveguide for which layer 102 provides the core. In other embodiments, the direction of travel may be reversed, with layer 103 efficiently capturing an optical mode supported by the waveguide for which layer 102 provides the core and gradually transforming its mode profile to that of a mode supported by the waveguide for which layer 101 provides the core.

The refractive index of layer 103 can be engineered to facilitate efficient coupling of mode profile 151 and to efficiently transform the mode to one with mode profile 155 by taking advantage of tapered structures made in layer 102 and/or 103. Prior to the present invention i.e. in the absence of intermediate layer 103, the requirements on taper tip width would be, as discussed above, problematic. The use of intermediate layer 103, however, significantly reduces the stringent requirements on taper tip width, allowing efficient transfer between very high refractive index materials (such as e.g. GaAs or GaN in layer 101) to low refractive index materials (such as e.g. SiN, $SiO_2$ in layer 102). Layer 103 may comprise a dielectric and/or a polymer.

Differences between the optical modes supported by waveguides in layers 101 and 102 respectively may or may not be obvious by observation of the mode profiles, but mode overlaps less than 100% could (in the absence of intermediate layer 103) result in significant optical loss. In some cases, it may be considered that losses of up to 1 dB are acceptable, but losses greater than that are not. In other cases, a 3 dB loss level may be the criterion chosen. The function of layer 103 is to keep optical loss due to imperfect mode overlap below whatever is determined to be an acceptable level in a given application.

The upper cladding layer 107 for waveguides realized in 103 and/or 102 can be ambient air (meaning no cladding material is actually deposited) or can be any other deliberately deposited suitable material as shown in FIG. 1, including, but not limited to, a polymer, $SiO_2$, SiNx, etc.

One or more lithography alignment marks (not shown in this cross sectional view, but see, for example, 320 in FIG. 3 described below) are present to facilitate precise alignment between the layers formed during various processing steps.

Figure 2:
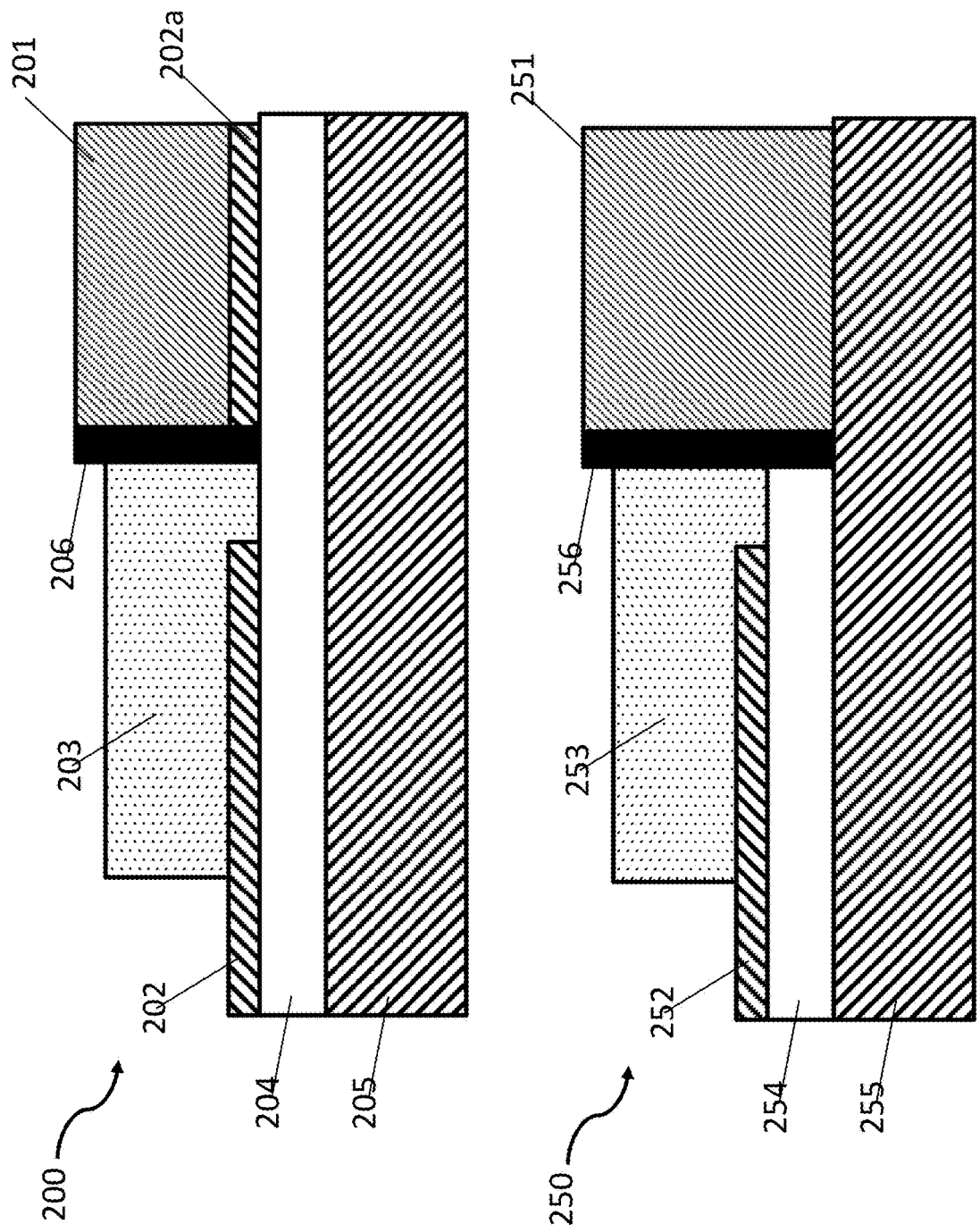
FIG. 2 illustrates two devices according to two corresponding embodiments of the present invention, shown in cross section.

FIG. 2 depicts two embodiments of the present invention. In one embodiment, the photonics integrated circuit 200 comprises substrate 205, optional layer 204 that can be deposited, grown, transferred, bonded or attached by other techniques known in the field. The refractive index of layer 202 is higher than the refractive index of layer 204 if present, or if layer 204 is not present, the refractive index of layer 202 is higher than the refractive index of substrate 205.

Layer 202 is deposited, grown, transferred, bonded or attached to the top surface of 204 (or 205 if 204 is not present) by other techniques known in the field. Layer 202 is patterned to form a waveguide and one or more other optical devices, but in this embodiment, part of the layer 202 (the part below active layer 201) is preserved through the patterning process, forming layer 202A. Layer 201, which corresponds to layer 101 in FIG. 1). is bonded on top of layer 202A. Said bonding can be direct molecular bonding or can use additional materials to facilitate bonding such as e.g. metal layers or polymer films as is known in the art. Layer 202a can be used to evanescently influence an optical mode in layer 201, can guide a hybrid mode that is hybridized between layers 201 and 202A and/or can serve electrical purposes such as conducting or blocking current.

Efficient transfer of power from layer 201 to 202 is facilitated by layer 203, where 203 facilitates mode transformation between modes supported by layer 201 and layer 202 (in the same way that layer 103 facilitates mode transformation in relation to FIG. 1) and in cases where 206 is present, by layer 206, which comprises an anti-reflective or highly-reflective coating.

In the embodiment shown in the lower part of FIG. 2, the photonics integrated circuit 250 comprises substrate 255, optional layer 254 that can be deposited, grown, transferred, bonded or attached by other techniques known in the field.

Layer 252 is deposited, grown, transferred, bonded or attached by other techniques known in the field to the top of layer 254 (or 255 if 254 is not present). The refractive index of layer 252 is higher than the refractive index of layer 254 if present, or if layer 254 is not present, the refractive index of layer 252 is higher than the refractive index of substrate 255.

Layer 252 is patterned to form waveguide and other optical devices, but in this embodiment, the part of layer 252 underlying layer 251 (to be described below) is removed as is the corresponding underlying part of layer 254 if present, with techniques known in the art, putting layer 251 in direct contact with substrate 255.

The direct contact between layers 251 and 255 in PIC 250 can facilitate better heat extraction through the substrate and/or by forming electrical current paths through layer 255. If the effective refractive index of layer 251 is higher than substrate 255, substrate 255 can also be used as an optical cladding layer. In some embodiments, layer 251 comprises cladding layers that serve to optically isolate the light generated in layer 251 from coupling to layer 255. Layers 251 and 255 are bonded, said bonding can be direct molecular bonding or can use additional materials to facilitate bonding such as e.g. metal layers or polymer films as is known in the art.

Figure 3:
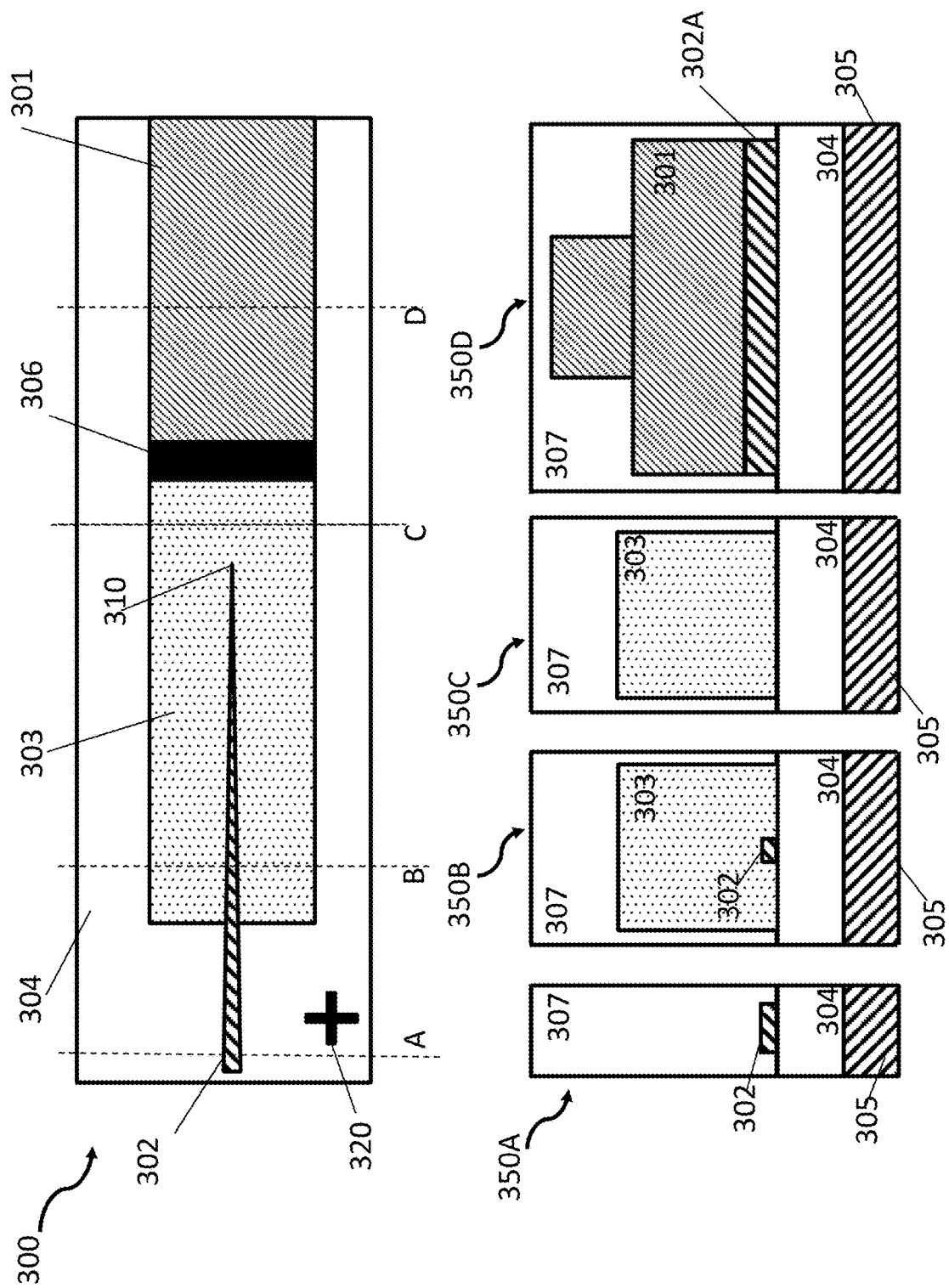
FIG. 3 shows a cross-sectional top-down view and cross-sectional end-on views of a device according to some embodiments of the present invention.

FIG. 3 offers a top-down view 300 and several corresponding end-on cross-sectional views 350A, 350B, 350C, 350D of a device according to some embodiments of the present invention.

Top-down view 300 shows optional layer 304 that covers substrate 305 (not visible in this view, but shown in views 350A, 350B, 350C, 350D). The optical mode supported by "active" layer 301 is guided through optional coating layer 306 to layer 303 that serves to convert the mode for efficient coupling to layer 302. To facilitate that coupling, the dimensions of layer 302 are tapered down towards layer 301, as indicated by the relatively small width of the tip 310 relative to the width of layer 302 shown at the extreme left of the figure. It has been calculated that the requirements on taper dimensions are significantly relaxed up to several hundred nanometers due to the presence of layer 303. For example, a coupling efficiency between 301 and 302 of or greater than 70% may be achieved, even if the refractive index difference between 301 and 302 is larger than one, for a tip width of a few hundred nanometers. In contrast, in the absence of layer 303, where layer 302 has to be tapered such that its mode may directly couple into layer 302, the dimensions of taper tip 310 would have to be much less than one hundred nanometers for a similar coupling efficiency. In another embodiment, a taper is created in layer 303 instead of in layer 302. In yet another embodiment, tapers may be created in both layers 302 and 303 for highly efficient coupling.

In some embodiments (not shown), the taper tip can physically touch layer 306 or, if layer 306 is not present, layer 301. In yet another embodiment (not shown), the tapering of layer 302 extends over the full length of layer 310 (to the right in the orientation shown in the figure) so that there is no abrupt termination, but the width variation continues to facilitate more efficient coupling.

One or more lithography alignment marks 320 (only one shown for simplicity) are used for precise alignment between various processing steps.

Cross-sectional views 350A, 350B, 350C, 350D correspond to four characteristic locations marked A, B, C and D in top down view 300. Cross-section 350D shows an exemplary cut through a region that comprises layer 301 (which typically includes a multilayered active structure) and optional layers 302A and/or 304 (as described with regard to 202A and 204 in relation to FIG. 2). In embodiments where layer 302 does not terminate before layers 306 and/or 301, of course view 350C would not be found. Cross-section 350B shows a region where the tapered transition between layers 303 and 302 is formed. As discussed above, the requirements on taper tip dimensions are significantly reduced due to mode conversion carried out by layer 303. Cross-section 350A shows one embodiment of layer 302 at the far left of the device as shown in view 300, after optical coupling (assuming optical signal flow from right to left in view 300) is complete. Typical heights and widths of waveguides 301, 303, and 302 can range from submicron to several microns, although they are largely dependent on specific material systems and implementations. Optional upper cladding layer 307 is shown in views 350A, 350B, 350C, 350D

Figure 4:
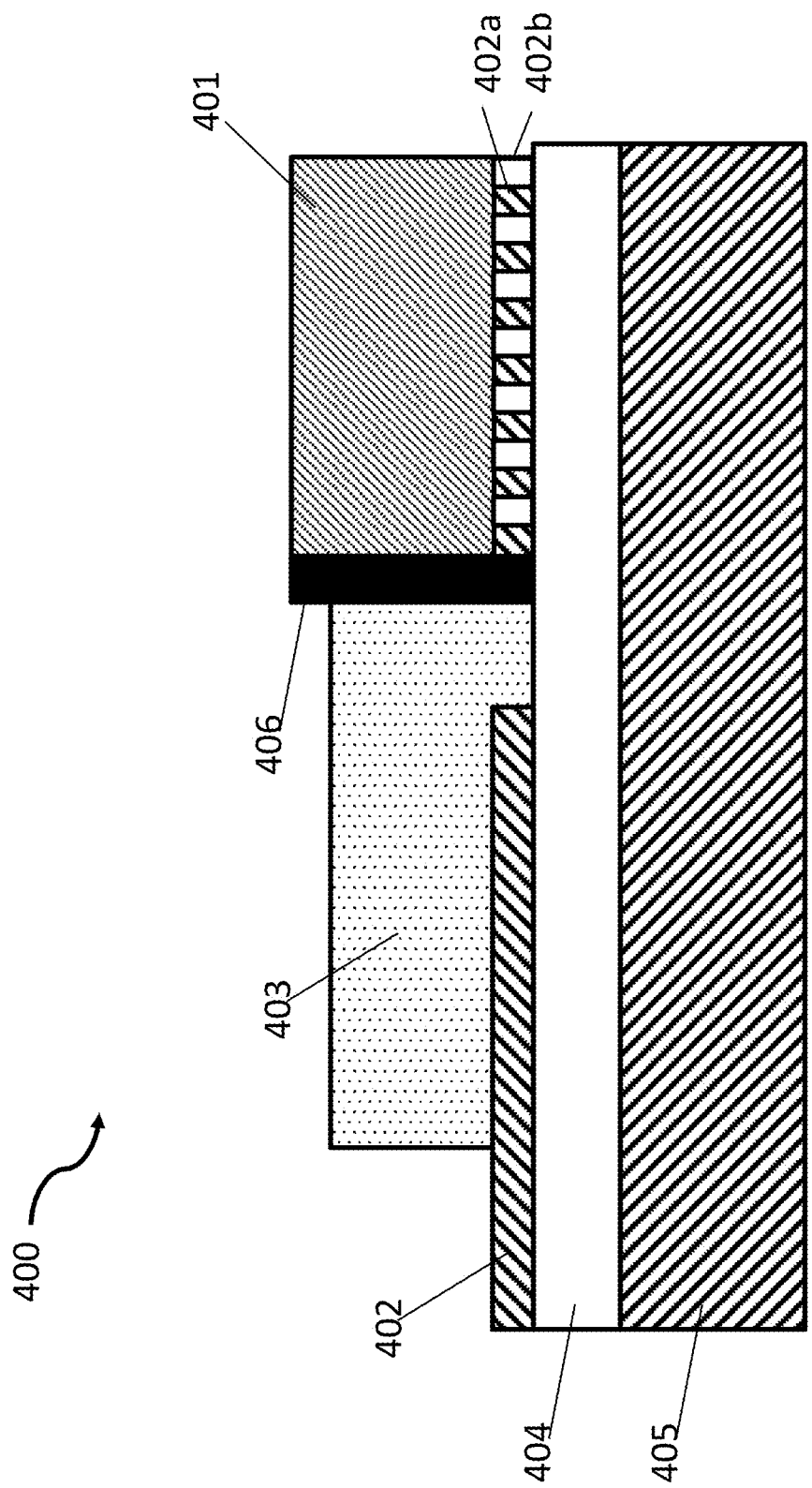
FIG. 4 illustrates a device according to another embodiment of the present invention, shown in cross-section.

FIG. 4 depicts a device according to one embodiment of the present invention where a passive waveguide is configured such that a wavelength selective structure is formed within it. In the shown embodiment, the photonics integrated circuit device 400 comprises substrate 405, and optional layer 404 that can be deposited, grown, transferred, bonded or otherwise attached to the top surface of substrate 405 using other techniques known in the field are used. The refractive index of layer 402 is higher than the refractive index of layer 404 if present, or if layer 404 is not present, the refractive index of layer 402 is higher than the refractive index of substrate 405.

Layer 402 is deposited, grown, transferred, bonded or attached by other techniques known in the field to the underlying layer 404 or, if 404 is not present, to substrate 405. Layer 402 is patterned to form a waveguide and optionally other optical devices. As shown, a part of layer 402 below active layer 401 (analogous to 301, 201, 101 in previous figures) is patterned to form a frequency selective structure comprising materials 402A and 402B, of different refractive indices. This frequency selective structure can be utilized to generate e.g. a single frequency laser such as a DFB laser or DBR laser, and/or can be used to make mirrors and other structures known to persons skilled in the art.

Figure 5:
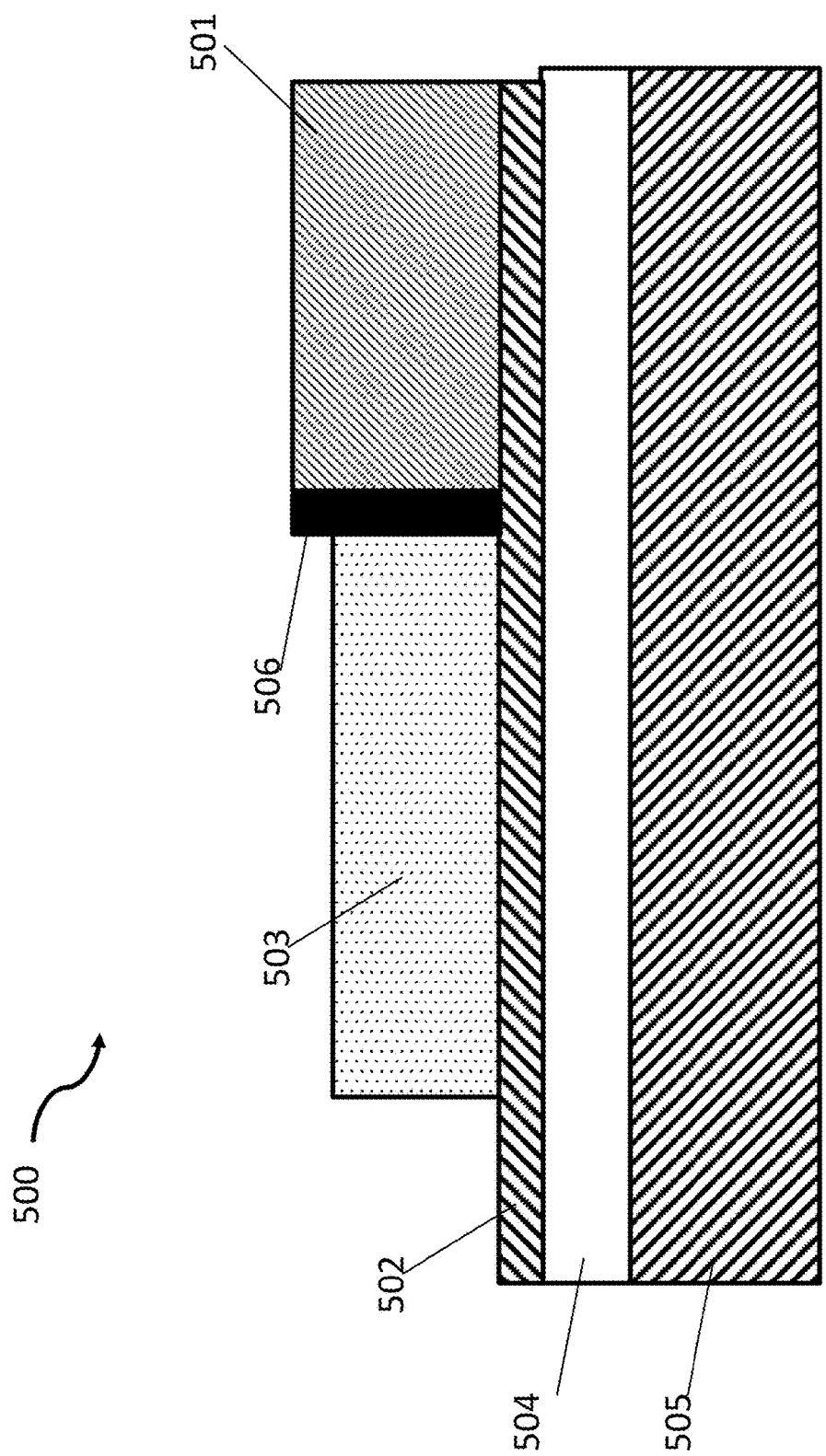
FIG. 5 illustrates a device according to yet another embodiment of the present invention, shown in cross-section.

FIG. 5 depicts a device according to one embodiment of the present invention where an unbroken or continuous dielectric waveguide extends through active and passive regions. In the shown embodiment, photonics integrated circuit device 500 comprises substrate 505, optional layer 504 that can be deposited, grown, transferred, bonded or attached to the top surface of 505 by other techniques known in the field. The refractive index of layer 502 is higher than the refractive index of layer 504 if present, or if layer 504 is not present, the refractive index of layer 502 is higher than the refractive index of substrate 505.

Layer 502 is deposited, grown, transferred, bonded or attached by other techniques known in the field to the underlying layer 504 or, if 504 is not present, to substrate 505. Layer 502 is patterned to form a waveguide and optionally other optical devices. As shown, layer 502 is continuous along the structure, extending below active layer 501. Layer 501 is bonded directly on top of layer 502 in this embodiment. The dimensions of layer 502 are optimized to facilitate efficient transfer of an optical mode between the waveguides formed by 501 and 502 respectively.

Figure 6:
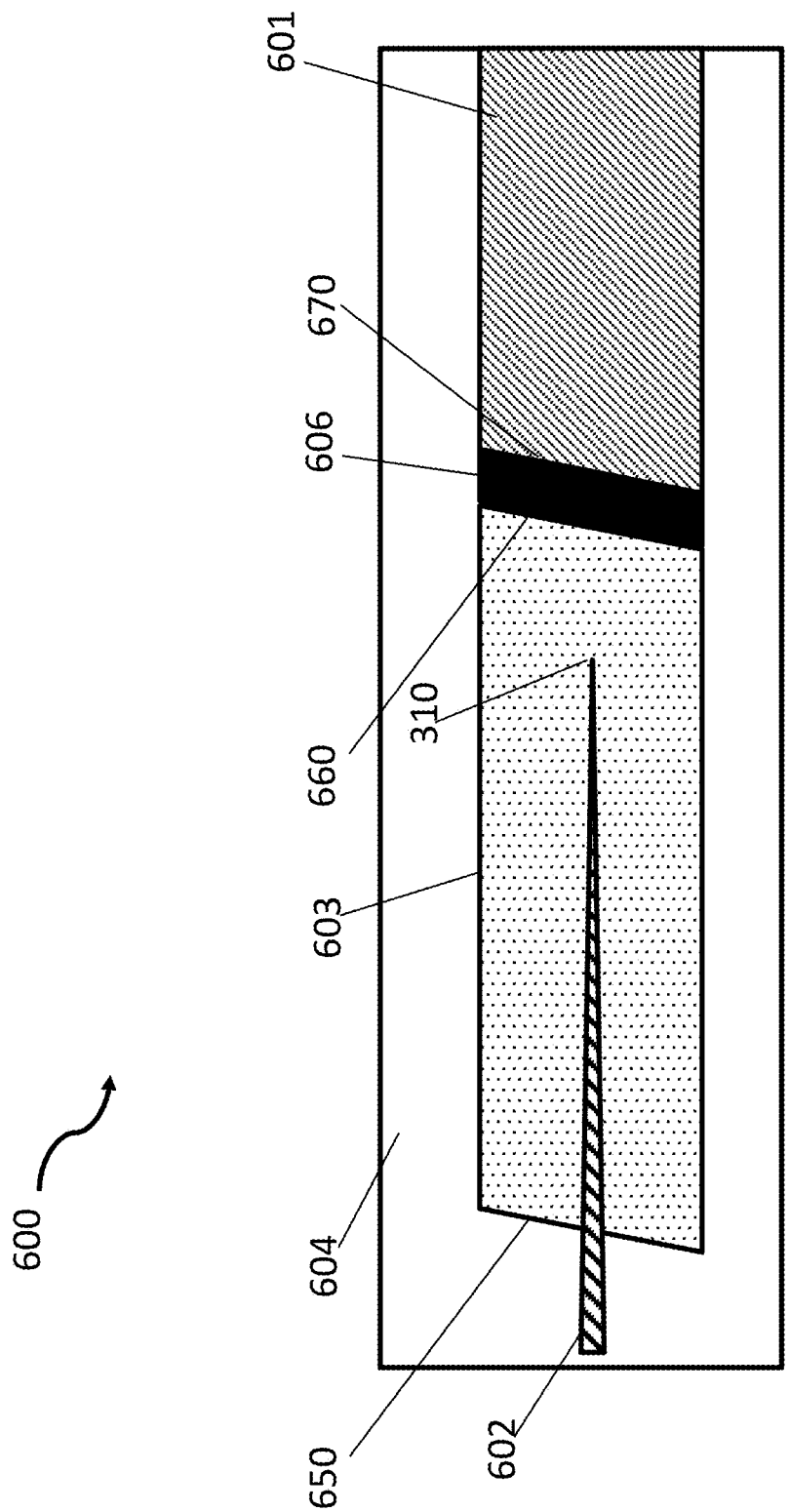
FIG. 6 shows a cross-sectional top-down view of a device according to some embodiments of the present invention.

FIG. 6 depicts a top-view of a device 600 according to one embodiment of the present invention, where boundaries between dissimilar materials are angled to reduce the back reflection. In the shown embodiment, optional layer 604 is present, overlying the device substrate (not shown). The optical mode supported by active layer 601 is guided through optional coating layer 606 to intermediate layer 603 that serves to convert the mode for efficient coupling to passive layer 602. To facilitate this transition, the dimensions of layer 602 are tapered down towards layer 601 as indicated by the relatively small width of the tip 610 relative to the width of layer 602 shown at the extreme left of the figure. As discussed above, the requirements on taper dimensions are significantly relaxed due to layer 603. Additionally, in this embodiment, one or more of interfaces 650, 650 and 670 are angled to reduce corresponding back reflection(s).

It is to be understood that optical coupling between modes in active and passive layers is reciprocal, so that, taking FIG. 1 as exemplary, the structure can be configured to facilitate light transmission from region 101 to region 102 as explicitly shown, but also to facilitate transmission in the reverse direction, from region 102 to region 101. In is to be understood that multiple such transitions with no limitation in their number or orientation can be realized on a suitably configured PIC.

Figure 7:
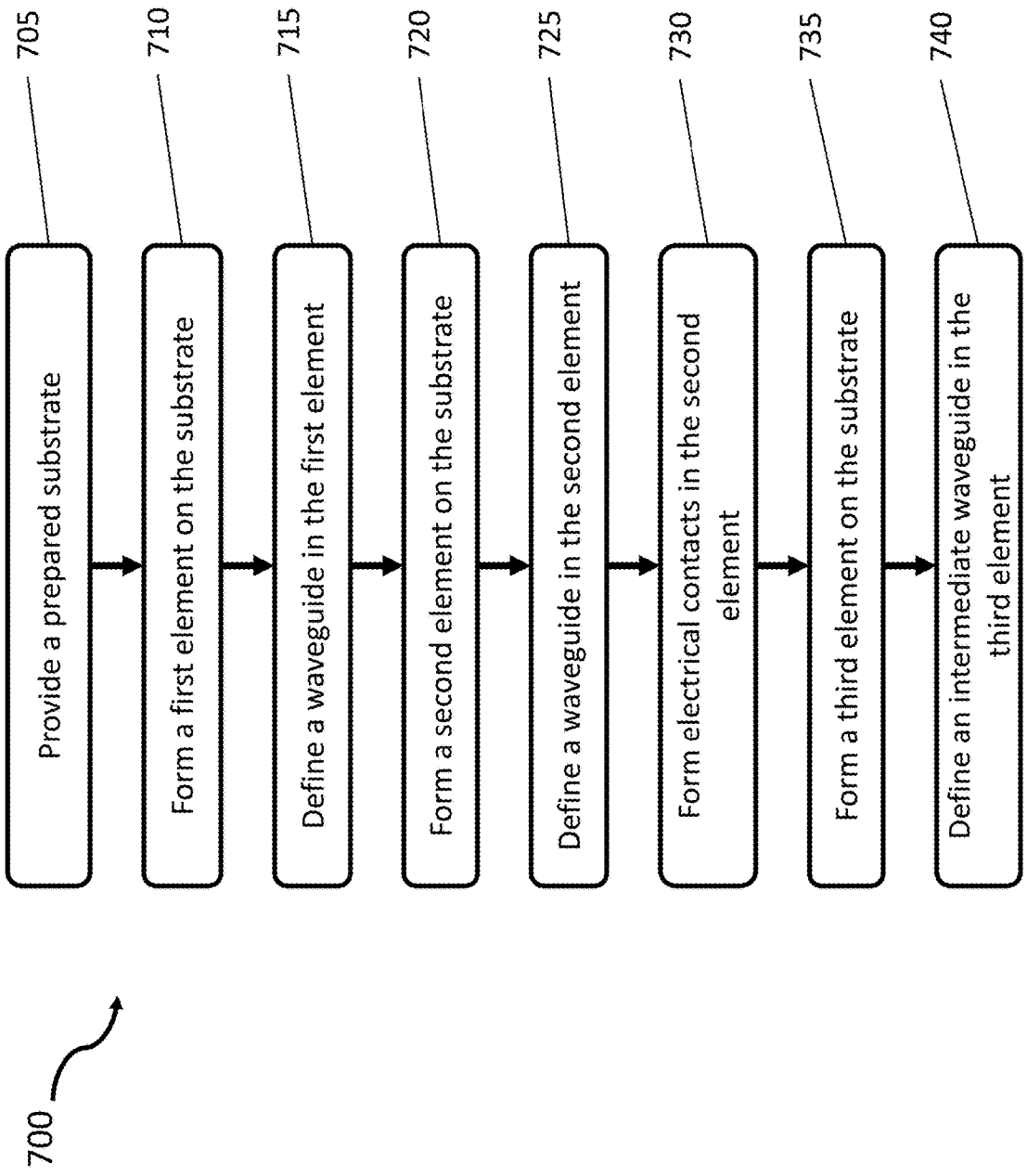
FIG. 7 is a process flow diagram of a method according to some embodiments of the present invention.

FIG. 7 is a process flow diagram of a method according to embodiments of the present invention, showing some of the operations carried out to make integrated devices of the types described above.

Method 700 for making the devices need not always include all the functions, operations, or actions shown, or to include them in exactly the sequence illustrated by the sequence from blocks 705 through 740 as shown. In an exemplary case, however, method 700 begins with block, 705, in which a substrate, suitably prepared for subsequent processing steps, is provided. Method 700 may then proceed from block 705 to block 710, where a first element, comprising one or more dielectric materials, is formed on the prepared substrate, by deposition, growth, transfer, bonding or some other well-known technique.

From block 710, method 700 may proceed to block 715 where a waveguide, and optionally other structures, such as, but not limited to, couplers, filters, resonators, etc. are defined in the first element, the waveguide comprising a core layer (202, 202A in the case of FIG. 2) and optionally a lower cladding layer (204 in the case of FIG. 2) (202, 202A in the case of FIG. 2, 102 in the case of FIG. 1). Subsequent steps (not shown) might include additional material deposition or removal in preparation for step 720.

From block 715, method 700 may proceed to block 720 in which a second element, typically involving an active semiconductor material, is bonded on the top surface of the structure (layer 104 on top of substrate 105, in the case of FIG. 1). Said bonding can be direct molecular bonding or can use additional materials to facilitate bonding such as e.g. metal layers or polymer films as is known in the art.

From block 720, method 700 may proceed to block 725, where a waveguide (101 in FIG. 1, 201 in FIG. 2) and optionally other structures, such as, but not limited to, couplers, filters, resonators, detectors, amplifiers, optical sources are defined in the second element, Next, at step 730, electrical contacts may be formed in the second element. In embodiments where the second element is used to provide a semiconductor light source, these contacts are used to drive the light source to generate light. In embodiments where the second element is used to provide a photodetector, these contacts may be used to convey the photodetector output signals.

Steps (not shown) subsequent to steps 725 and/or 730 might include additional material deposition or removal in preparation for step 735, in which a third element, comprising one or more dielectric materials, is formed (by deposition, growth, transfer, bonding or some other well-known technique) in a location between and in contact with the first and second elements, Next, at step 740, an intermediate waveguide is defined in the third element.

Further processing of the various dielectric and/or semiconductor layers, and/or electrical contacts, and the addition and processing of index matching layers, upper cladding, bonding pads, etc may be performed as is known in the art.

Embodiments of the present invention offer many benefits. The integration platform enables scalable manufacturing of PICs made from multiple materials and capable of covering a wide wavelength range from visible to IR and handling high optical power compared to typical Si waveguide-based or InP waveguide-based PICs.

Previous approaches have generally used taper structures in order to transfer an optical mode from an active device to a passive device, where a width of compound semiconductor region is adiabatically tapered down to sub-micron size. However, a required width of the taper tip decreases rapidly to tens of nanometer sizes as the difference in refractive indices increases. The present invention deploys a butt coupling scheme to eliminate the need of a very small taper size in the compound semiconductor waveguide, which eases fabrication of such structures.

Other approaches have relied on die attachment of prefabricated optical active devices to passive waveguides. This requires very stringent alignment accuracy which is typically beyond what a typical die-bonder can provide. This aspect limits the throughput of this process as well as the performance of optical coupling.

This present invention utilizes a process flow consisting of typically wafer-bonding of a blanket piece of compound semiconductor material on a carrier wafer with dielectric waveguides and subsequent semiconductor fabrication processes as is known in the art. It enables an accurate definition of optical alignment between active and passive waveguides via typically photo lithography step, removing the need for precise physical alignment. Said photo lithography-based alignment allows for scalable manufacturing using wafer scale techniques.

Efficient optical transfer between dissimilar materials is facilitated by using a butt-coupling approach in combination with a mode-converter (the intermediate waveguide) that removes the need for narrow taper tips that are challenging to resolve and fabricate with current state-of-the-art tools.

In some embodiments the active region can utilize the substrate for more efficient thermal sinking, due to direct contact to the substrate with no dielectric in-between. In such embodiments, active region fully defines the optical waveguide in active region and transitions to passive region via the above mentioned butt-coupling.

In some embodiments, the active region creates a hybrid waveguide structure with dielectric layers which can be used, for example, to create a wavelength selective component formed inside the laser cavity for e.g. distributed feedback (DFB) lasers or similar components.

Embodiments of the optical devices described herein may be incorporated into various other devices and systems including, but not limited to, various computing and/or consumer electronic devices/appliances, communication systems, sensors and sensing systems.

It is to be understood that the disclosure teaches just few examples of the illustrative embodiment and that many variations of the invention can easily be devised by those skilled in the art after reading this disclosure and that the scope of the present invention is to be determined by the following claims.

The invention claimed is:

1. A device comprising:
first, second and third elements fabricated on a common substrate;
wherein the first element comprises an active waveguide structure supporting a first optical mode, the second element comprises a passive waveguide structure supporting a second optical mode, and the third element, at least partly butt-coupled to the first element, comprises an intermediate waveguide structure supporting intermediate optical modes;
wherein, if the first optical mode differs from the second optical mode by more than a predetermined amount, a tapered waveguide structure in at least one of the second and third elements facilitates efficient adiabatic transformation between the second optical mode and one of the intermediate optical modes;
wherein no adiabatic transformation occurs between any of the intermediate optical modes and the first optical mode; and
wherein mutual alignments of the first, second and third elements are defined using lithographic alignment marks that facilitate precise alignment between layers formed during processing steps of fabricating the first, second and third element;
wherein a part of the second element underlies the first element;
wherein the first optical mode has an evanescent field partly residing in the second element; and
wherein the part of the second element underlying the part of the first element is patterned to form a wavelength selective structure.

2. The device of claim 1, additionally comprising:
a lower cladding layer, overlying the common substrate, and underlying the first, second and third elements;
wherein the active waveguide structure, the passive waveguide structure, and the intermediate waveguide structure comprise waveguide core materials characterized by first, second, and third refractive indices respectively; and
wherein the lower cladding layer is characterized by a fourth refractive index lower than each of the first, second and third refractive indices.

3. The device of claim 2, additionally comprising:
an upper cladding layer characterized by a fifth refractive index, the upper cladding layer overlying at least one of the second element and the third element, wherein, if the upper cladding layer overlies the second element, the fifth refractive index is lower than the second refractive index; and wherein, if the upper cladding layer overlies the third element, the fifth refractive index is lower than the third refractive index.

4. The device of claim 1, wherein the active waveguide structure in the first element comprises a photodetector; and wherein optical propagation through the device occurs primarily in a direction from the passive waveguide structure to the active waveguide structure via the intermediate waveguide structure.

5. The device of claim 1, wherein the first element is in direct contact with the common substrate, the common substrate providing at least one of heatsinking and an electrical interface.

6. The device of claim 1, wherein the second element is present in a continuous layer underlying the first and third elements.

7. The device of claim 1, further comprising:

an anti-reflective coating layer between the first and third elements.

8. The device of claim 1, further comprising: a high reflectivity coating layer between the first and third elements.

9. The device of claim 1, wherein the active waveguide structure in the first element comprises an optical source; and wherein optical propagation through the device occurs primarily in a direction from the active waveguide structure to the passive waveguide structure via the intermediate waveguide structure.

10. A device comprising:

first, second and third elements fabricated on a common substrate;

wherein the first element comprises an active waveguide structure supporting a first optical mode, the second element comprises a passive waveguide structure supporting a second optical mode, and the third element, at least partly butt-coupled to the first element, comprises an intermediate waveguide structure supporting intermediate optical modes;

wherein, if the first optical mode differs from the second optical mode by more than a predetermined amount, a tapered waveguide structure in at least one of the second and third elements facilitates efficient adiabatic transformation between the second optical mode and one of the intermediate optical modes;

wherein no adiabatic transformation occurs between any of the intermediate optical modes and the first optical mode; and wherein mutual alignments of the first, second and third elements are defined using lithographic alignment marks that facilitate precise alignment between layers formed during processing steps of fabricating the first, second and third element;

wherein at least one of the first interface between first and second elements, and the second interface between second and third elements, is angled at an angle optimized to minimize reflections.

11. The device of claim 10, further comprising:

an anti-reflective coating layer deposited on the at least one angled interface.

* * * * *